UNITED STATES PATENT OFFICE.

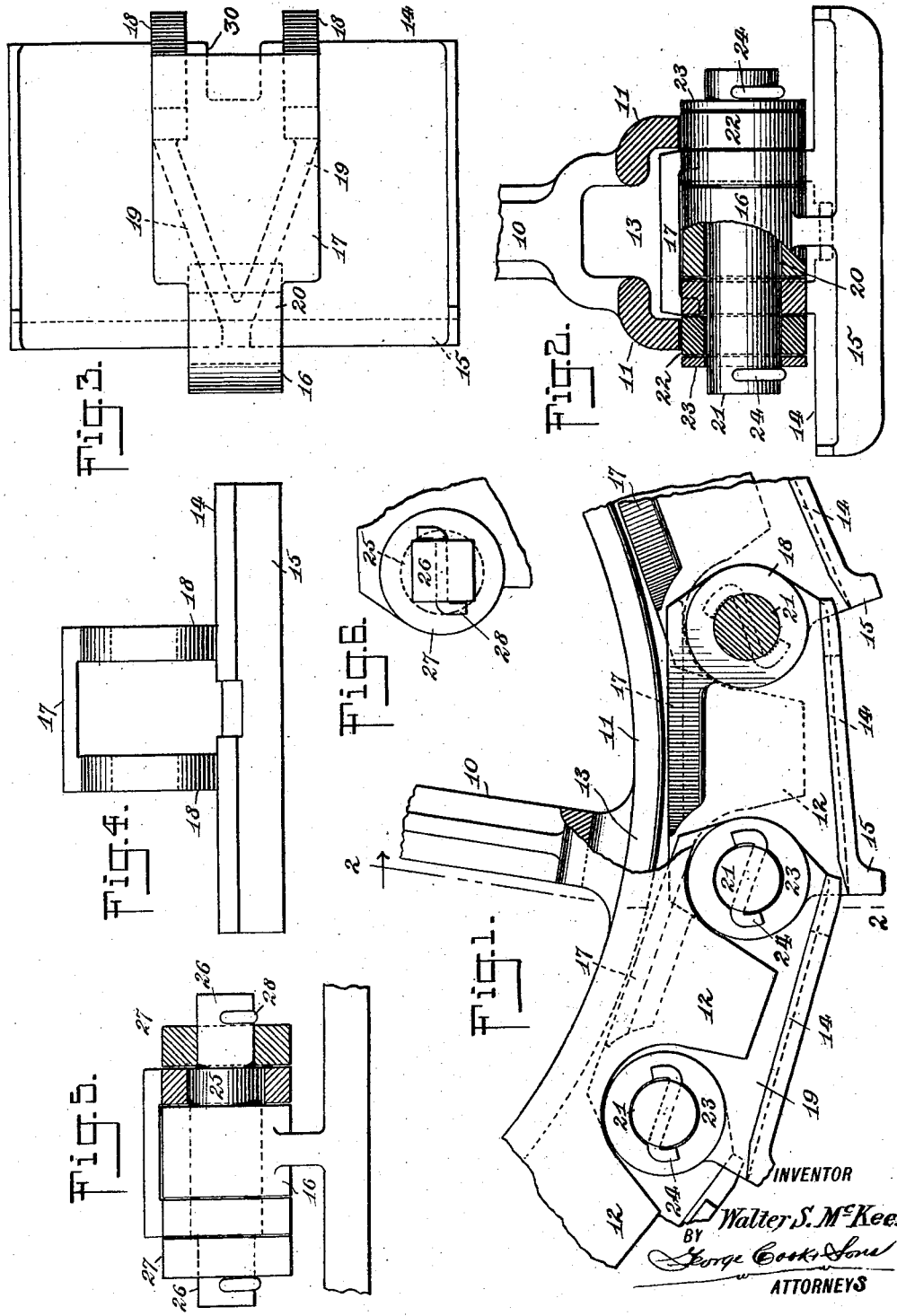

WALTER S. McKEE, OF CHICAGO, ILLINOIS.

TRACTOR LINK.

1,418,316. Specification of Letters Patent. Patented June 6, 1922.

Application filed November 7, 1919. Serial No. 336,326.

*To all whom it may concern:*

Be it known that I, WALTER S. McKEE, a citizen of the United States, and a resident of Chicago, in the county of Cook and State of Illinois, have made and invented certain new and useful Improvements in Tractor Links, of which the following is a specification.

My invention relates to tractor links. An object of the present invention is to provide a link, or links, which are of simple design, strong and durable in construction, economic in upkeep and will cause and will be subjected to, a minimum amount of wear and friction in operation.

A further object is to provide a tractor link wherein the friction and wear from the link, incident to the normal operation of the tractor, will be reduced to a minimum and those parts which are exposed to wear, will become worn in a uniform manner and so perform efficient and useful services during the period of wear. and further to so arrange and construct the link that the wearing parts may be easily and readily removed and new parts substituted in their places.

A further object is to provide a tractor link and tractor sprocket wherein the mud and dirt which ordinarily accumulate between the teeth of the sprocket are continuously and automatically removed by the action of the tractor links.

With the above and other objects in view, my invention consists in the improved tractor link hereinafter described and claimed and illustrated in the accompanying drawings, accompanying and forming a part of this application; and in such modifications thereof as will be obvious to those skilled in the art to which my invention relates.

The preferred embodiment of my invention is shown in the accompanying drawings, wherein;

Figure 1 is a view of a portion of a tractor sprocket and accompanying portions of tractor links embodying the characteristic features of my invention;

Figure 2 is a view in vertical section taken on the line 2—2 of Figure 1;

Figure 3 is a view in top plan of one of the tractor links;

Figure 4 is a view in rear elevation of the tractor link illustrated in Figure 3;

Figure 5 is a view in front elevation and partially in section of the tractor link having a modified form of bearing pin and cooperating rollers, and;

Figure 6 is an end view of the modified form of bearing pin and accompanying roller.

Referring to the several views, wherein similar reference numerals indicate corresponding parts throughout, the tractor sprocket is composed of the spokes 10 which are forked at their lower extremities and support the spaced rims 11. The rims 11 are provided with spaced teeth 12 which are adapted to engage portions of the tractor link and forcibly drive the same as hereinafter described. The forking of the lower extremity of the sprocket spokes and the spacing of the rims 11 cause an opening 13 to be formed which extends continuously around the sprocket and allows such mud and dirt as would ordinarily accumulate between the teeth to be continuously and automatically discharged therethrough, this action taking place due to portions of each tractor link entering between the rims of the sprocket as the said links pass therearound.

Each tractor link is composed of a tread portion 14, the front of which is provided with a downwardly projecting transverse rib 15 whereby the purchase upon the ground is increased and slippage materially reduced. Projecting upwardly and preferably formed integral with the link tread is the front and main bearing member 16, the same lying directly above the transverse rib 15 of the tread. A plate 17 connects with the front bearing member 16, projects rearwardly above the link tread and joins the spaced rear bearing members 18, the spacing of the latter being such as to receive therebetween the front bearing member of the adjoining link. Diverging webs 19 connect with the front and rear bearing members 16 and 18 and with the tread 14 and plate 17, thus forming a strong and rigid box like structure.

The front and rear bearing members are provided with pin receiving openings 20 so positioned that when the links are assembled with the front bearing member projecting between the rear bearing members of the adjoining link, the said openings will be in substantial alignment, providing for the reception of a bearing pin 21 which acts to tie the several links together and allows for the articulation thereof.

The bearing pin 21, which effects a bearing fit with the aligned front and rear bearing members, projects beyond the sides of the bearing members 18 and is provided with the rollers 22 thereon. Suitable washers 23 are assembled upon the bearing pin 21 and are held in place by the pins or keys 24. The rollers 22 turn freely upon the pin 21 and accordingly reduce the wear and friction occasioned by the driving of the sprockets, to a minimum, and thus provide for the maximum life of the bearing pins and rollers. Further the rollers being freely mounted upon the bearing pins 21 become worn in a uniform manner so as to render efficient service and may easily and quickly be removed and replaced by first removing the keys 24 and washers 23.

In those instances where the weight upon the several links would be sufficient to cause the rear bearing members 18 to cut and seriously wear the bearing pins, I provide the rear bearing members with openings of slightly reduced diameter so that the bearing pin 21 effects a force fit with the rear bearing members, thereby preventing the relative rotation of the bearing pin and the rear bearing members. I have found, however, that in the majority of instances the rear bearing members may be made of sufficient width so as to prevent excessive wear upon the bearing pins so that the latter may also be free to rotate in the rear bearing members.

In order to provide for the relative movement or articulation of the several links the rear portion of the tread of each link is provided with a notch or opening 30 which is adapted to receive therein the front portion of the diverging web 19, thus allowing for the free movement of the links without interference. In order to provide for the uniform wear of the bearing pin, the modified construction illustrated in Figure 5 has been provided, wherein the bearing pin 25 is provided with the reduced and non-circular ends 26, and the rollers 27, are provided with corresponding openings so that they fit over the reduced ends of the bearing pin and effect a non-rotatable juncture therewith.

The bearing pin 25 effects a bearing fit with the front and rear bearing members of the links whereby as the tractor link passes around the sprocket the rollers 27 coming in contact with the sprocket teeth are rotated, providing for the uniform, but reduced wear of the rollers and in turn causing the rotation of the pin 25, thereby providing for uniform wear of the pin and resulting in the maximum useful life of the several parts. The rollers 27 are held upon the extremities 26 of the bearing pin by the keys or pins 28 which may be readily withdrawn and the rollers or bearing pin renewed when necessary. The spacing of the rims of the sprocket and the mounting of the rollers upon the extremities of the pin provide a double drive upon each link which tends to distribute the strains and stresses over the entire link.

Having thus described my invention, what I claim is:

1. In a mechanism of the class described the combination of adjoining tractor links, said links provided with a front bearing member and spaced rear bearing members having aligned openings, a bearing pin projecting through and beyond the sides of aligned front and rear bearing members of adjoining links, detachable rollers mounted upon the protruding ends of said pin, means for holding said rollers in position upon said pin, and means for causing the rotation of said rollers to impart a similar movement to said pin.

2. In a mechanism of the class described the combination of adjoining links, said links provided with bearing members having aligned openings and a bearing pin projecting through and beyond the sides of said bearing members, the projecting ends of said pin of non-circular cross-section, rollers having non-circular openings therein mounted upon the non-circular ends of said bearing pin and means for holding the said rollers in position thereon.

Signed at Chicago, in the county of Cook and State of Illinois, this first day of November, A. D. 1919.

WALTER S. McKEE.

Witnesses:
N. C. BASON,
EARL A. LERNER.